(12) United States Patent
Backmann et al.

(10) Patent No.: US 10,207,448 B2
(45) Date of Patent: Feb. 19, 2019

(54) METHOD FOR CHANGING A MATERIAL AND CORRESPONDING EXTRUSION DEVICE

(71) Applicant: Windmöller & Hölscher KG, Lengerich (DE)

(72) Inventors: Martin Backmann, Lengerich (DE); Markus Bussmann, Essen (DE); Ansgar Avermeyer, Georgsmarienhütte (DE); Tobias Kulgemeyer, Hagen (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days.

(21) Appl. No.: 14/763,854

(22) PCT Filed: Oct. 29, 2013

(86) PCT No.: PCT/EP2013/072647
§ 371 (c)(1),
(2) Date: Jul. 28, 2015

(87) PCT Pub. No.: WO2014/114375
PCT Pub. Date: Jul. 31, 2014

(65) Prior Publication Data
US 2015/0367553 A1    Dec. 24, 2015

(30) Foreign Application Priority Data
Jan. 28, 2013  (DE) .................. 10 2013 100 812

(51) Int. Cl.
*B29C 47/92* (2006.01)
*B29C 47/08* (2006.01)
(Continued)

(52) U.S. Cl.
CPC .............. *B29C 47/92* (2013.01); *B29B 7/603* (2013.01); *B29C 47/0874* (2013.01);
(Continued)

(58) Field of Classification Search
CPC . B29B 7/603; B29C 47/0874; B29C 47/0879; B29C 47/1009; B29C 47/1027;
(Continued)

(56) References Cited

U.S. PATENT DOCUMENTS 4,455,761 A * 6/1984 Terhune ................ B29B 13/065
                                                          264/141
5,465,657 A    11/1995 Wu
(Continued)

FOREIGN PATENT DOCUMENTS

CN    101844375    9/2010
DE    1802694      5/1970
(Continued)

OTHER PUBLICATIONS

International Preliminary Report on Patentability dated Apr. 29, 2015 From the International Preliminary Examining Authority Re. Application No. PCT/EP2013/072647 and Its Translation Into English.
(Continued)

*Primary Examiner* — Ryan M Ochylski

(57) ABSTRACT

The invention relates to a method for the changing of material from a starting material to a subsequent material with an extrusion device (10) for the production of extrusion products (100) comprising the following steps:
  recognition of a change of material requirement,
  performance of at least one preparation step for the change of material,
  performance of the change of material after termination of at least one of the preparation steps.

13 Claims, 5 Drawing Sheets

(51) Int. Cl.
*B29C 47/10* (2006.01)
*B29B 7/60* (2006.01)
*B29C 47/00* (2006.01)
*B29B 7/42* (2006.01)
*B29B 7/48* (2006.01)
*B29B 7/72* (2006.01)

(52) U.S. Cl.
CPC ...... *B29C 47/0879* (2013.01); *B29C 47/1009* (2013.01); *B29C 47/1027* (2013.01); *B29B 7/428* (2013.01); *B29B 7/488* (2013.01); *B29B 7/72* (2013.01); *B29C 47/0026* (2013.01); *B29C 47/0881* (2013.01); *B29C 2947/926* (2013.01); *B29C 2947/9218* (2013.01); *B29C 2947/9299* (2013.01); *B29C 2947/92161* (2013.01); *B29C 2947/92304* (2013.01); *B29C 2947/92333* (2013.01); *B29C 2947/92485* (2013.01); *B29C 2947/92495* (2013.01)

(58) Field of Classification Search
CPC .. B29C 2947/9218; B29C 2947/92333; B29C 2947/92485; B29C 2947/92495; B29C 2947/9299
See application file for complete search history.

(56) References Cited

U.S. PATENT DOCUMENTS

2008/0290537 A1* 11/2008 Bacher ............... B01F 7/18
 264/37.1
2010/0317769 A1* 12/2010 Graf .................. B01F 13/1027
 524/1

FOREIGN PATENT DOCUMENTS

| DE | 3900664 | 7/1990 | |
|---|---|---|---|
| DE | 4214081 | 11/1992 | |
| DE | 202004015743 | 2/2006 | |
| DE | 102004051196 | 4/2006 | |
| DE | 102004051196 A1 * | 4/2006 | ............ B29C 31/02 |
| DE | 102011112016 | 1/2013 | |
| EP | 0318170 | 5/1989 | |
| EP | 0899079 | 3/1999 | |
| EP | 1188539 | 3/2002 | |
| EP | 1647386 | 4/2006 | |
| EP | 2236261 | 10/2010 | |
| FR | 2608498 | 6/1988 | |
| JP | 59-131438 | 7/1984 | |
| JP | 63-218330 | 9/1988 | |
| JP | 63-222829 | 9/1988 | |
| JP | 02-026720 | 1/1990 | |
| JP | 2002-067121 | 3/2002 | |
| JP | 2011-140220 | 7/2011 | |
| SU | 1452693 | 1/1989 | |
| WO | WO 2014/114375 | 7/2014 | |

OTHER PUBLICATIONS

International Search Report and the Written Opinion dated Jul. 23, 2014 From the International Searching Authority Re. Application No. PCT/EP2013/072647 and Its Translation of ISR in English.

Pruefungsantrag [Request for Examination] dated Jul. 31, 2013 From the Deutsches Patent- und Markenamt [German Patent and Trademark Office] Re. Applicaton No. 102013100812.7.

Aiuchi Database WPI [Online], XP002725793, Week 200242, Database Accession No. 2002-388079, 2002.

Babichuk et al. Database WPI [Online], XP002720722, Week 198944, Database Accession No. 1989-322202, 1989.

Nagatani Database WPI [Online], XP002720721, Week 198843, Database Accession No. 1988-303646, 1988.

Tsukui Database WPI [Online], XP002725792, Week 201149, Database Accession No. 2011-J35296, 2011.

Notification of Office Action and Search Report dated Aug. 12, 2016 From the State Intellectual Property Office of the People's Republic of China Re. Application No. 201380070969.X and Its Translation Into English.

Translation Dated Mar. 21. 2016 of Pruefungsantrag [Request for Examination] dated Jul. 31, 2013 From the Deutsches Patent- und Markenamt [German Patent and Trademark Office] Re. Applicaton No. 102013100812.7.

Notification of Office Action and Search Report dated Mar. 16, 2017 From the State Intellectual Property Office of the People's Republic of China Re. Application No. 201380070969.X and Its Translation Into English. (13 Pages).

* cited by examiner

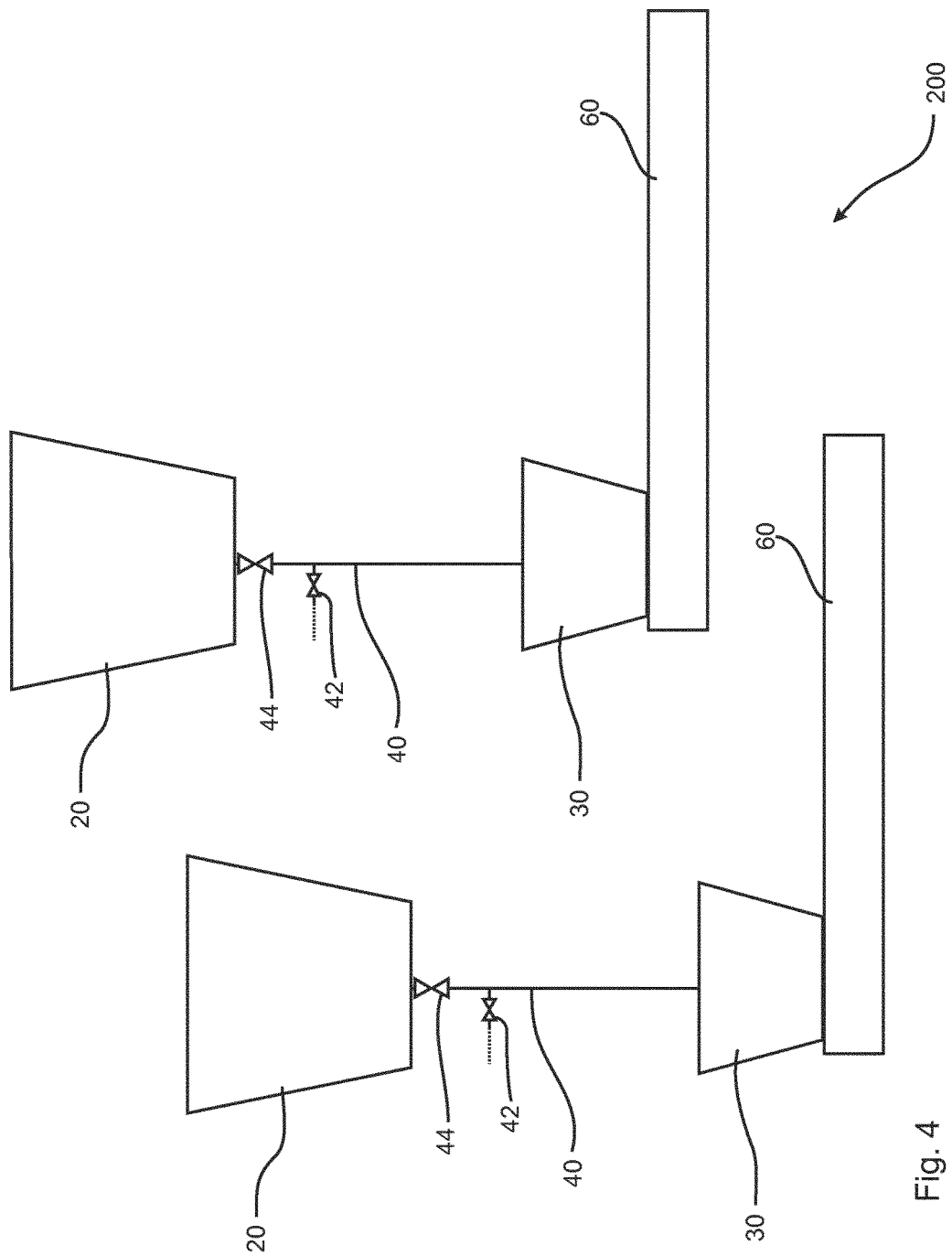

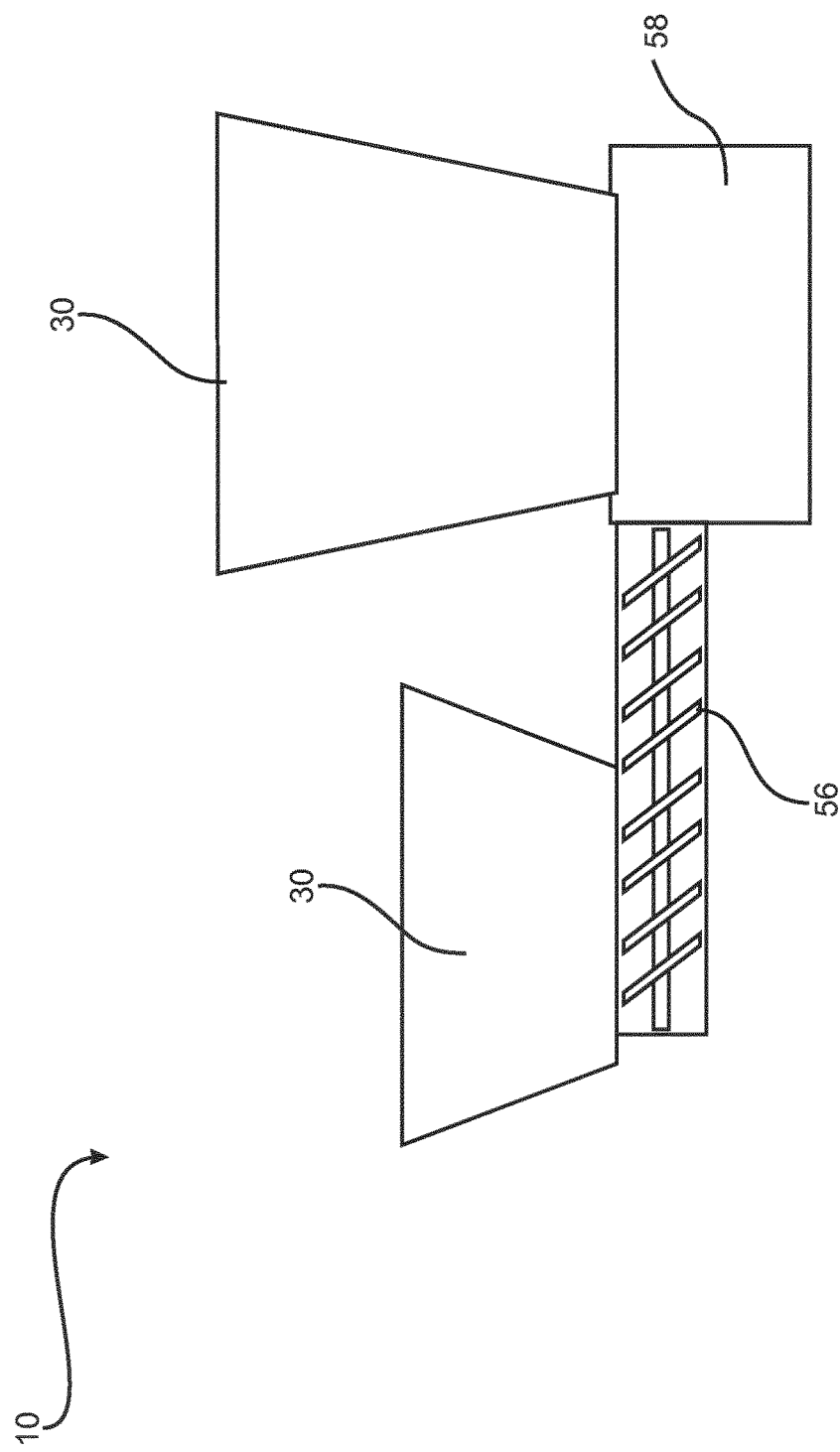

METHOD FOR CHANGING A MATERIAL AND CORRESPONDING EXTRUSION DEVICE

RELATED APPLICATIONS

This application is a National Phase of PCT Patent Application No. PCT/EP2013/072647 having International filing date of Oct. 29, 2013, which claims the benefit of priority of German Patent Application No. 10 2013 100 812.7 filed on Jan. 28, 2013. The contents of the above applications are all incorporated by reference as if fully set forth herein in their entirety.

FIELD AND BACKGROUND OF THE INVENTION

The present invention relates to a method for changing a material from a starting material to a subsequent material in an extrusion device and an extrusion plant for the production of an extrusion product.

Basically extrusion plants are known. They are used in order to produce extrusion products. Such extrusion products can be injection moulding products, particularly film products. One possibility of extrusion products are so called blown films. Hereby, the extrusion device is normally equipped with at least one extruder in a barrel extruder. This extruder is supplied with extruder material. The corresponding material which should be used for the current formulation can also be described as starting material. For the supply of starting material normally supply devices, like for example a storage tank and/or a storage scale are known. These serve for the provision of a proportioned supply of starting material to the barrel extruder.

With this known extrusion plants after termination of the production of a first extrusion product and prior to the start of the production of a second extruder product with different stocks of material a change of material has to occur. This means that instead of the used starting material a subsequent material is supplied to the extrusion device. This change of material is performed entirely manual with known extrusion plants. Hereby, after termination of the performance of a first formulation during the production of a first extrusion product frequently a complete cleaning of the extrusion plant is performed. It is also known that with known extrusion plants during the transition period the new subsequent material is filled into the storage tanks or the storage scales. After a certain transition period the subsequent material has completely replaced the starting material from the storage tank, the storage scale and the extruder. During this transition period the produced extrusion product is however not equipped with defined properties according to the adjusted formulation. Accordingly, the produced extrusion product during this transition period is waste. Disadvantageously with this method are the produced waste and the high time requirement during the manual performance of the change of materials. Alternatively performed complete internal cleanings of the extrusion plants are likewise time consuming and produce high cost and downtimes.

SUMMARY OF THE INVENTION

It is the object of the present invention to at least partially avoid the previously described disadvantages. Particularly, it is the object of the present invention to be able to perform the change of material in a cost efficient and simple manner, particularly automated.

The previous object is solved by a method with the features of claim 1 and an extrusion plant with the features of claim 10. Further features and details of the invention result from the depending claims, the description and the drawings. Thereby, features and details which are described in connection with the method according to the invention apply naturally also in connection with the extrusion plant according to the invention and vice versa so that according to the disclosure of the single aspects of the invention it can always be reciprocally related to.

The method according to the invention serves for the change of material from a starting material to a subsequent material with an extrusion device for the production of extrusion products. Such a method comprises the following steps according to the invention:

- recognition of a change of material requirement,
- performance of at least one preparation step for the change of material,
- performance of the change of material after termination of the at least one preparation step.

Based on the method according to the invention for the change of material now the termination of the performance of the production of a first formulation concerning the extrusion product is not awaited anymore. Rather, according to the invention a preparation with the help of at least one preparation step occurs. This preparation occurs already before the change of material and particularly during the performance of the production of an extrusion product with the starting material. With other words, the preparation of the change of material can be performed in a parallel manner. This parallel work involves a time advantage since parallel performed working leads to minimal or no downtimes of the extrusion plant or the extrusion device. Rather a downtime during the change of material for the extrusion device can be completely avoided with the method according to the invention.

Preparation steps according to the present invention can be configured in different manners. It is however crucial that this preparation already takes place at a point of time which lies ahead of the change of material. Particularly, the preparation step is already terminated before the performance of the change of material.

With the starting material within the sense of the present invention the material or the material composition has to be understood, which is within the extrusion device for the production of the first formulation of an extrusion product. By a subsequent material within the sense of the present invention the material or the material composition has to be understood, which should be used for the subsequent formulation with the production of a further second extrusion product. After the change of material the subsequent material has become the next starting material in relation to the following change of material.

A method according to the invention is particularly automated or partly automatized. Preferably, the automation relates particularly to such preparation steps, which are performed already parallel to the performance of the production of the extrusion product with the starting material. Thus, by the demand of a change of material requirement the preparation can be performed automatically already during the production with the starting material. The actual change of material can take place manually or particularly likewise automatically, so that it is ensured by automation that the advantages of a reduction of time for the change of material according to the invention can be reliably achieved. Further, the quality of the change of material is increased by the preparation step in an automated manner by only minimally intermingling the starting material and the subsequent material.

With the method according to the invention it is basically irrelevant, if the extrusion device is fed with a single starting material or with different starting materials at one time. Particularly, two or more starting materials, for example colour components in form of pigments can be used as additional starting material. Thus, in an extrusion device a single starting material or a mix from different starting materials can be used. The preparation step according to the invention thereby always relates to the change of material of a single starting material. If with the change of the formulation during the production of an extrusion product a change of two or more starting materials becomes necessary, the method according to the invention can naturally be performed parallel for all materials to be changed.

For the parts of the method or the preparation step, which are not automated, but have to be performed manually, preferably a guidance of the operating personnel is intended. Thus, the current state of the preparation step or the current state of the change of material can be displayed for example with the help of a software application or an optical display device at the extrusion device. Additionally it is possible that with such a software or a display device information or detailed work instructions are displayed, which guide the operating personnel for the performance of the preparation step and/or the change of material.

Preferably, for each starting material at the extrusion device at least one storage tank and one storage scale are available. Storage tank and storage scale are connected to one another for example with the help of a downpipe, so that with the method according to the invention it can be fallen back on the data of the sensor device for these single components. Particularly, the sensor device comprises single sensors, which communicate the filling level of the storage scale, the filling level of the storage tank and the current operating state and/or the filling state of the downpipe. Such sensors can also be called initiators. Thus it becomes possible to draw a conclusion between the current formulation situation of the starting material and the to be expected formulation situation for the further course during the production of the extrusion product with this formulation. Particularly a prognosis can occur at which point of time and under with conditions a termination of the production of the extrusion product with the first formulation occurs. On the basis of this knowledge and this prognosis a preparation step can be performed even more exactly, like this is subsequently described.

One of the goals of the present invention is to create a preferably short transition between the starting material and the subsequent material. Accordingly, the transition period described in the introduction of this application should be preferably short. This leads to a preferably short time, which does not provide a usable manner of the extrusion product. Rather, in this manner the waste during the change of material can be reduced. Particularly the preparation step is designed in a manner that a mixing of material of the starting material and the subsequent material in the suction pipe, the storage tank, the downpipe and/or the storage scale is minimized or completely avoided. Accordingly, the mix of material is reduced to the extruder itself, so that with high safety the extruder cannot drain. Therewith, a particularly sharp separation between the starting material and the subsequent material can be achieved during the performance of the change of material. This is subsequently described in detail.

Advantageously it is possible, when with the method according to the invention as a preparation step the emptying of a storage tank of an extrusion devise and the filling of the storage tank with the subsequent material is performed. With this manner of the preparation step an exact separation between the starting material and the subsequent material occurs within the storage tank. The emptying of the storage tank can for example occur by a prognosis of the formulation. Thus, it can be ensured that the storage tank can be completely emptied into the storage scale at a point of time in which the extruder is still in the production of the first formulation of the extrusion product. During this production from the pattern of the storage scale the storage tank is already emptied and can be filled with the subsequent material. As soon as the filling level of the storage scale has been reduced and the risk of a run dry of an extruder would occur, the storage tank can be reopened and the storage scale can be filled with the subsequent material. Therewith, during the change of material only a minimal mixing between the starting material and the subsequent material occurs within the storage scale. Thus, a relatively sharp separation between the subsequent material and the starting material occurs at the supply edge of the storage scale and therewith also over the course of the extruder. Naturally, the emptying of the storage tank can also occur actively into a separate tank. Thus, the storage tank with excessive material of the starting material, which is no longer needed for the current formulation during the production of the extrusion product, can be emptied completely. This emptying can be disposed as waste. However, it is also possible to perform a return into the collecting tank or the silo with this starting material from the storage tank, which mainly contains pure starting material. Therewith, not only a reduction of waste can be achieved by minimizing the transition time between the starting material and the subsequent material, but rather also a reduction of the material consumption. As excessive material from the storage tank is so to say regained or led back purely.

It is further an advantage, when with the method according to the invention the emptying of a storage scale and/or a downpipe between a storage tank and a storage scale is performed as a preparation step, particularly in form of an emptying suction. Additionally, or alternatively to this embodiment, like it is described in the previous paragraph, as a preparation step also a filling level adjustment of the downpipe and/or the storage scale can occur. This adjustment can likewise occur for example by a formulation calculation and therewith a prognosis of the further extrusion state. Therewith it can be ensured in the storage scale via the filling state determination that in the storage scale the necessary remaining amount for the performance of the productions until the end of the first formulation with the starting material for the extrusion product is available mainly exactly. However, it is also possible that a buffer amount of starting material exists within the storage scale. This buffer amount ensures that also with unexpected cases an emptying of the extruder is avoided. This buffer amount however has to be removed for the change of material with this embodiment of the method according to the invention. Thus, in an analogue manner also the storage scale can be emptied actively. This can occur with an ongoing or stationary extruder. The emptying can likewise occur again in a separate collecting tank. However, it is also possible that a pure return of the starting material from the downpipe and/or the storage scale is performed in a corresponding silo as a collecting tank for the starting material. Therewith, the same advantages can be achieved like they have been described in the previous paragraph. With the return also an active emptying can occur. Thus, for example at the downpipe and/or the storage scale an emptying valve can be assembled in order to achieve an emptying of the respective volumes via a negative pressure.

It is moreover an advantage, when with the method according to the invention the recognition of a change of material requirement occurs by a monitoring of the formulation amount and a prognosis of the to be performed extrusion amount. Thus, a regulation unit for the performance of a method according to the invention can be pretended with an extrusion device. In this regulation unit the desired extrusion amount (product amount) during the production of the extrusion product can be pretended by the operating personnel. It is also known how long the extruder needs for the production of the first variation of the extrusion product with the starting material. Thus, it can be actively calculated in advance by the regulation unit, at which point of time which remaining time is needed for the production of the predefined amount of extrusion material of the first formulation. Further it is known how long a predefined preparation step needs in order to be terminated. Using both of this data the regulation unit can with the method according to the invention calculate in advance at which time the preparation as a preparation step has to be started, so that preferably little time is needed for the stand still of the extruder. Particularly, the preparation step is mainly performed in a way that it is terminated at a point of time, at which also the calculated production amount of the extrusion product is achieved. Thus, preferably a completely parallel performance of the preparation step and the production of the remaining amount of the extrusion product occurs. In this manner the recognition of a change of material requirement can be pretended particularly automated from the regulation unit itself.

Another advantage is, when with the method according to the invention as a preparation step a switch from a first big storage tank with the starting material to a second smaller storage tank with the starting material occurs. Subsequently an emptying of the first big storage tank and a filling of the first big storage tank with the subsequent material is performed. Naturally, with the knowledge about a particularly small formulation amount with the production of the extrusion product a small storage tank can be used from the beginning. Likewise the use of two separate storage tanks enables to perform a clean separation between the starting material and the subsequent material. This separation however does not affect the functionality of the extruder or the extrusion device. Thus, also this preparation step of changing and filling or emptying of the big storage tank can likewise occur parallel to the production of the extrusion product. Therewith, also here the advantages according to the invention can be achieved.

It is likewise an advantage, when with the method according to the invention as the preparation step a cleaning of the extrusion device or of parts of the extrusion device from starting material is performed. During the performance of an extrusion process it can happen that the starting material sticks at parts of the extrusion device. This relates to the suction pipe, the storage tank, the downpipe, the storage scale and the extruder itself. Therefore, part of the preparation step can be a cleaning step, which eliminates or enables an elimination of exactly these residues of starting material. This cleaning step can be performed during the performance of the extrusion process and/or in a still stand of the extrusion device.

With the method according to the previous embodiment particularly the subsequent further development are meaningful. Thus it can be an advantage when as a cleaning step particularly one of the following steps is performed:
  activation of at least a knocking unit for removing residues of the starting material,
  activation of a blow-out system,
  reversing of the direction of rotation of a dosing screw,
  production of an air vortex particularly a cyclone-like air vortex,
  production of a pressure wave and/or a negative pressure wave.

The previous non-final list is an enumeration of possible cleaning steps. A knocking unit serves particularly for avoiding granular-like starting material in the storage container, in the downpipe and/or in the storage scale. The knocking unit can thereby particularly be configured as a vibration unit in order to perform the cleaning step. A blow-out system serves for providing different air streams. This is particularly about an air vortex, for example a cyclone-like blow-out of the starting material from the respective component. If a dosing screw is intended for dosing for example in the storage tank, likewise a cleaning step can be provided by an alteration of the direction of rotation.

Likewise it is an advantage, when with the method according to the invention as a preparation step a cleaning run of the extrusion device is performed with an intermediate material. Particularly with high viscosity differences in the melted state between the starting material and the subsequent material such an intermediate material can be an advantage as a buffer. The cleaning run thereby particularly serves for cleaning of the single components of the extrusion device from a starting material. Further, the intermediate material serves for an increased or complete avoidance of mixings between the starting material and the subsequent material due to high viscosity differences. Thereby, it is ensured by the intermediate material that a clean separation between the two different formulations of the extrusion product exists. For the introduction of the intermediate material for example a material bypass can be intended in order to be able to insert the intermediate material from a separate storage tank and/or a separate storage scale into the extruder.

With the method according to the invention it can further be an advantage, when after the preparation step a securing step is performed, which comprises particularly one of the following steps:
  request of the installation of all necessary tanks,
  correct positioning of the material hoses.

By the securing step it is ensured that automatically or manually performed preparation steps have actually occurred or have been performed in a correct manner. Thereby, a security function can be provided which stops the subsequent change of material with not carefully or not correctly performed preparation steps. Particularly with an automation a feedback loop can be provided which prevents failing performances during the change of material.

A further subject of the present invention is an extrusion plant for the production of an extrusion product. This extrusion plant is equipped with at least one extrusion device which comprises an extruder, a storage scale for the feeding of the extruder and at least one storage tank for the feeding of the storage scale. An extrusion plant according to the invention is characterized in that at least one sensor device for the determination of the filling level is intended in the at least one storage tank and/or in the storage scale. Further, at least one control unit is intended which is configured for the performance of a method according to the invention. Accordingly, an extrusion plant according to the invention provides the same advantages like they are described in detail regarding to the method according to the invention. Particularly the sensor device, the storage tank and/or the storage scale are equipped in a manner that they comprise the necessary components which allow the performance of the method according to the invention. Additionally, for example a suction device for suctioning of granules from the silo can be available for the conveyance in the storage tank. It is possible that a downpipe is available for the transfer of the starting material between the storage tank and the storage scale. The sensor device can comprise different sensors which are located at different positions. Naturally, the sensor device can be equipped in a different manner or with different sensor functionalities. The sensor device can also be designated as an initiator device.

An extrusion plant according to the invention can be further established in a way that the sensor device comprises at least one sensor from the subsequent list:
  ultrasound sensor
  infrared sensor
  optical sensor
  laser sensor
  load cell
  capacitive sensor
  inductive sensor
  rotor sensor
  swim sensor The previous non-final list is an enumeration of possible sensors of the sensor device according to the invention. This leads to the fact that a filling state measurement is possible at the respective position. Also the recognition of the state of the respective component in relation to the containing material in another manner as the filling state is possible within the sense of the present invention. Thus, for example the material density, the bulk density, the weight and other parameters can be determined for determination of the corresponding state.

Further it is an advantage when with the extrusion plant according to the invention between the storage tank and the storage scale a mechanically lockable clean-out valve is assembled. This clean-out valve can also be called storage valve. It serves for a complete closure of the storage tank towards the storage scale. If an emptying of the storage tank occurs in a complete manner, thus the emptied storage tank can be sealed via the mechanically locked clean-out valve and can subsequently be filled with subsequent material. The mechanical locking particularly occurs via a drive device.

Likewise it is advantageous when with the extrusion plant according to the invention at least one cleaning unit is intended, comprising at least one of the following configurations:
  knocking unit
  purge unit
  flexible tank wall
  porous screw cylinder
  hinged screw cylinder
  rotatable screw cylinder The previous enumeration is a non-final list. The knocking unit and the purge unit are already described concerning their mode of action in relation to the method according to the invention. With a flexible tank wall a resolving of sticked starting material can occur by an elastic deformation of the tank wall. The corresponding configuration of a screw cylinder of a dosing screw in a porous manner, in a hinged manner or in a rotatable manner likewise involves the possibility of a resolving of sticked starting material.

BRIEF DESCRIPTION OF THE SEVERAL VIEWS OF THE DRAWINGS

Further advantages, features and details of the invention result from the subsequent description, in which embodiments of the invention are described in detail with relation to the drawings. Thereby the described details in the claims and in the description can be essential for the invention single for themselves or in any combination. It is schematically shown:

DESCRIPTION OF SPECIFIC EMBODIMENTS OF THE INVENTION

Figure 1:
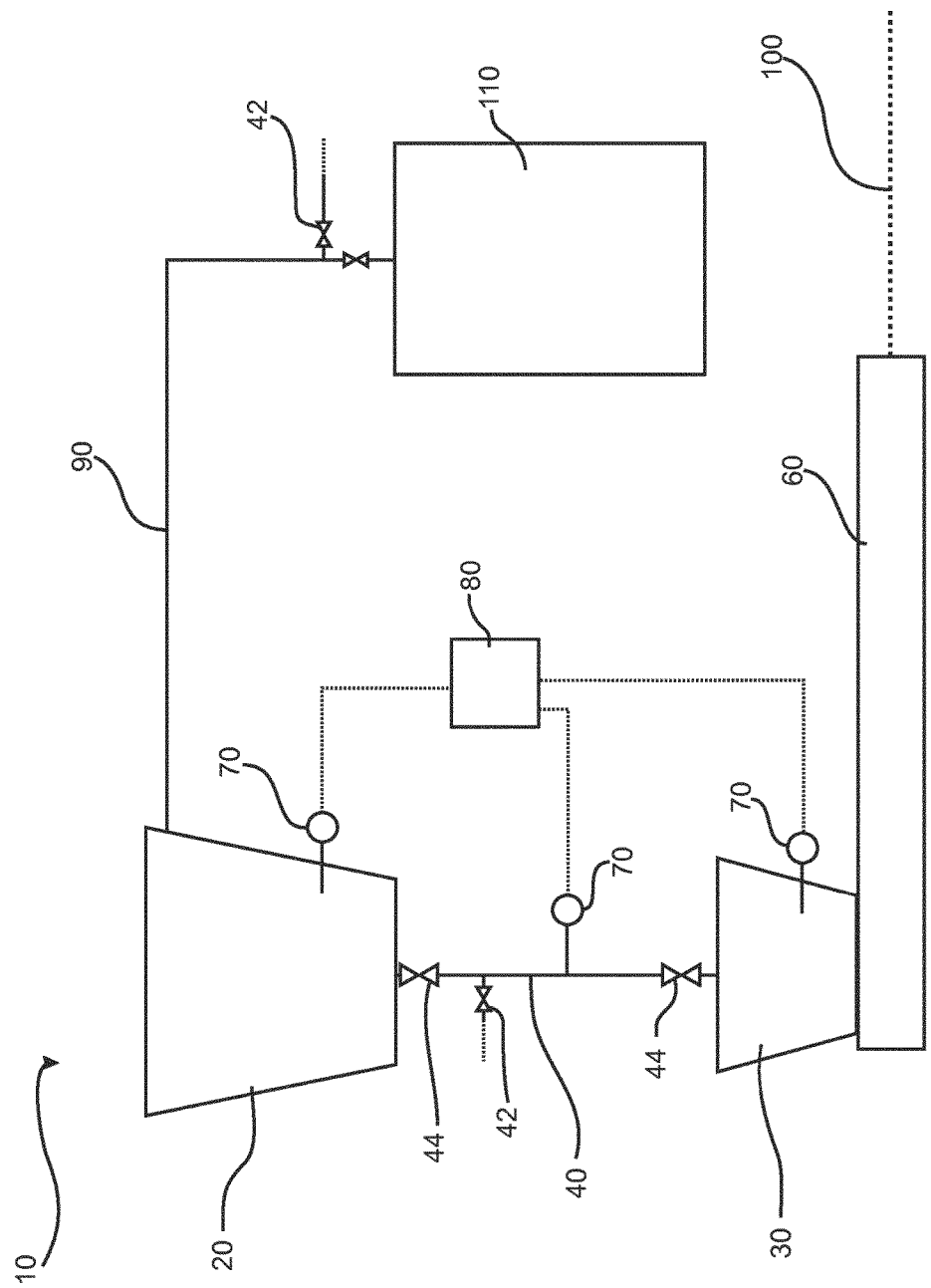
FIG. 1 a first embodiment of an extrusion device for the performance of a method according to the invention, FIG. 2 a further embodiment of an extrusion device for the performance of a method according to the invention, FIG. 3 a detailed description of a storage tank of an extrusion device, FIG. 4 an embodiment of an extrusion unit according to the invention, FIG. 5 an embodiment of a dosing screw.

In FIG. 1 a float chart of an extrusion device 10 is shown schematically. This comprises an extruder 60, which is equipped with a barrel extruder (not shown). The extruder 60 is fed with starting material via a storage scale 30. Further, a storage tank 20 is intended, in which starting material is assembled. Via a downpipe 40 the starting material can be guided from the storage tank 20 to the storage scale 30.

Further, sensor devices 70 can be recognized, which are established in a communication connection with a control unit 80. In the downpipe 40 further a storage flap 44 is shown in a valve-like manner. Further a clean-out valve 42 is assembled in the downpipe 40.

With the method according to the invention a change of material requirement is recognized or pretended in the stationary product state of this extrusion device 10. Then, subsequently a preparation step can be performed in a manner according to the invention. Thus, for example a storage tank 20 can be completely emptied before or after the storage flap 44 is closed. After complete emptying subsequently the storage tank 20 is filled with subsequent material. Alternatively it is also possible to provide a particularly active emptying of the storage scale 30 and the downpipe 40 for example via the clean out valve 42.

Further, in FIG. 1 a silo 110 is shown from which the storage tank 20 can be filled. The filling occurs via a suction pipe 90, which is impinged with a vacuum. With a change of material now the vacuum can be increased and at the same time a clean-out valve 42 can be opened at the suction pipe 90. Additionally, preferably the access to the silo 110 is closed via another valve. In this manner also the suction pipe 90 can be prepared for the change of material with a reduced mixing of starting material and subsequent material.

Figure 2:
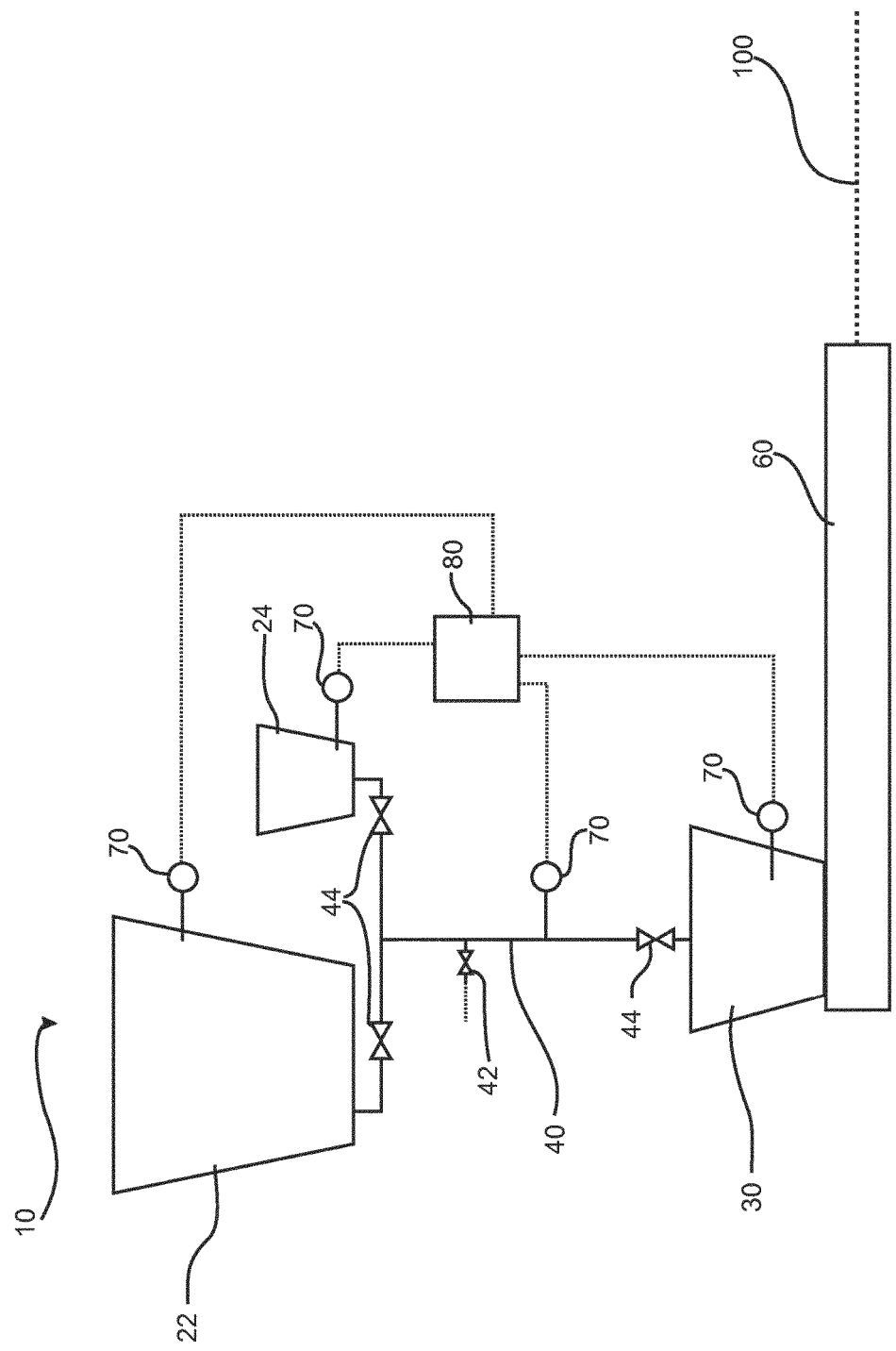

Further in FIGS. 1 and 2 an additional storage flap 44 is assembled at the lower edge of the downpipe 40. In this manner an emptying of the storage tank 20 can occur into the downpipe in order to subsequently fill the storage tank 20 with the subsequent material. Therewith, also the downpipe 40 can be used for the disposition of the starting material.

Via the sensor device 70 assembled within the downpipe 40 the filling state can also be monitored within the downpipe 40.

FIG. 2 shows a variation of an extrusion device 10, with which a first big storage tank 22 and a second smaller storage tank 24 is intended. It can be switched over between both storage tanks so that accordingly two storage flaps 44 are intended. By switching over from the big storage tank 22 to the small storage tank 24, subsequently a complete emptying of the first big storage tank 22 and a subsequent filling with subsequent material can occur. Likewise it is again possible to mainly completely avoid a mixing between the starting material and the subsequent material.

Figure 3:
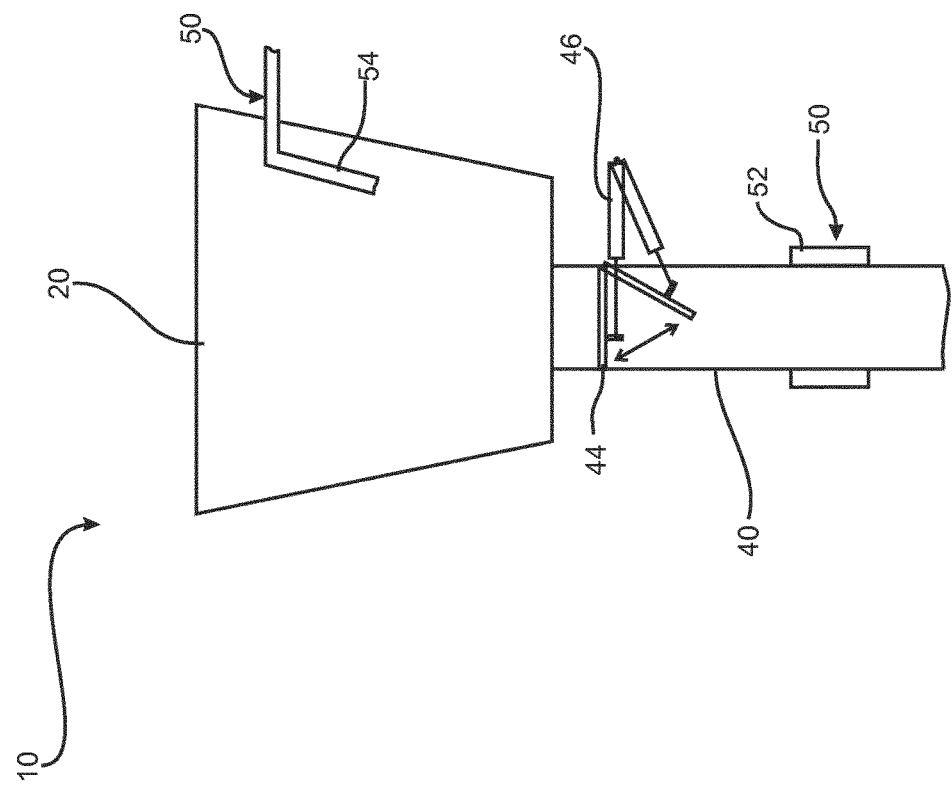

FIG. 3 shows schematically different possibilities of cleaning units 50. Thus, it is possible that a knocking unit 52 is intended at the downpipe 40 as a cleaning unit 50. This serves for performing a mechanic influence in form of vibration or knocking to the downpipe 40. Sticking remaining materials of starting materials are released in such a manner. Further, it can be recognized that according to the embodiment in FIG. 3 a purge system 54 is intended as a cleaning unit 50. About this a compressed air impact or even a cyclone-like vortex can be provided, which enables the cleaning of the storage tank 20 in a manner according to the invention. Naturally, the single components can be additionally or alternatively assembled between the storage tank 20 and the not shown material separator.

In FIG. 3 likewise a detailed embodiment of a storage flap 44 is shown with aq drive 46. This drive 46 particularly serves for the mechanical locking of the storage flap 44 in a closed state, so that a clean separation between these volumina and therewith the avoidance of the mixing between the subsequent material and the starting material can occur.

FIG. 4 shows an extrusion plant 200, with which two extrusion devices 10 can be combined with one another schematically according to the embodiment of FIG. 1.

In FIG. 5 a possibility of the connection for additional components is shown. Thus, a storage scale 30 can be introduced in a mixing device 58 via a dosing screw 56 from a storage scale 30 for the additional component. In this mixing device 58 the mixing with the main component of the starting material from the corresponding storage scale 30 (here assembled on the right) occurs.

The previous description of the embodiments describes the present invention only within the scope of examples. Naturally single features of the embodiments, as far as technically meaningful, can be freely combined with one another without leaving the scope of the present invention.

REFERENCE LIST

10 Extrusion device
20 Storage tank
22 First big storage tank
24 Second smaller storage tank
30 Storage scale
40 Downpipe
42 Clean-out valve
44 Storage flap
46 Drive
50 Cleaning unit
52 Knocking unit
54 Purge system
56 Dosing screw
58 Mixing device
60 Extruder
70 Sensor device
80 Control unit
90 Suction pipe
100 Extrusion product
110 Silo
200 Extrusion plant

What is claimed is:

1. A method for the changing of material from a starting material to a subsequent material with an extrusion device for the production of extrusion products comprising the following steps:
    obtaining a parameter indicative of a time period required for at least emptying, cleaning and filling a storage tank which is connected by a downpipe to a storage scale feeding an extruder,
    performing a recognition of a requirement to a change of material, by monitoring a formulation amount and based on a prognosis of a still to be performed extrusion amount,
    based on said prognosis and said parameter, in response to the recognition and during a performance of a production of an extrusion product with a starting material by the extruder, calculating a time point in which a change of material preparation process needs to be started,
    at said calculated time point starting:
        driving at least one storage flap mechanically assembled to said downpipe connecting between said storage tank and said storage scale for emptying the starting material from the storage tank,
        cleaning of the storage tank from the starting material, and
        driving the at least one storage flap to a close state and filling the storagetank with the subsequent material.

2. The method according to claim 1, further comprising at least emptying of the storage scale or the downpipe as a preparation step.

3. The method according to claim 1, wherein the storage tank is a second smaller storage tank; further comprising switching from a first big storage tank with the starting material to the second smaller storage tank with the starting material and subsequently emptying of the first big storage tank and filling of the first big storage tank with the subsequent material as a preparation step.

4. The method according to claim 1, wherein the cleaning comprises:
    activation of at least one knocking unit for releasing remaining parts of the starting material,
    activation of a purge system,
    reversing of the direction of rotation of a dosing screw,
    production of an air vortex,
    a cyclone-like air vortex, and
    production of a pressure wave or a negative pressure wave.

5. The method according to claim 1, wherein the cleaning is performed with intermediate material.

6. The method according to claim 1, further comprising requesting installation of necessary tanks, and correcting positioning of the material pipes.

7. An extrusion plant for the production of an extrusion product with at least one extrusion device, comprising:
    an extruder;
    a storage scale for feeding the extruder;
    at least one storage tank for feeding the storage scale;
    at least one downpipe connecting between said at least one storage tank and said storage scale;
    at least one sensor device for determining a filling level of at least one of the at least one storage tank and the storage scale; and a control unit that executes code instructions for:
obtaining a parameter indicative of a time period required for at least emptying, cleaning and filling said at least one storage tank,
performing a recognition of a requirement to a change of material, by monitoring a formulation amount and based on a prognosis of a still to be performed extrusion amount,
based on said prognosis and said parameter, in response to the recognition and during a performance of a production of an extrusion product with a starting material by the extruder, calculating a time point in which a change of material preparation process needs to be started,
at said calculated time point starting:
  driving at least one storage flap mechanically assembled to said at least one downpipe for emptying the starting material from said at least one storage tank,
  cleaning of the storage tank from the starting material; and
  driving the at least one storage flap to a close state and filling the storage tank with the subsequent material.

8. Extrusion plant according to claim 7, wherein the at least one sensor device comprises at least one member of a group consisting of:
  ultrasound sensor
  infrared sensor
  optic sensor
  laser sensor
  load cell
  capacitive sensor
  inductive sensor
  rotor sensor
  swim sensor.

9. Extrusion plant according to claim 7, wherein the cleaning is performed by at least one of the following configurations:
  knocking unit
  purge unit
  flexible tank wall
  porous screw cylinder
  hinged screw cylinder
  rotatable screw cylinder.

10. A method for the changing of material from a starting material to a subsequent material with an extrusion device for the production of extrusion products comprising:
  obtaining a parameter indicative of a time period required for at least emptying, cleaning and filling a storage tank which is connected by a downpipe to a storage scale feeding an extruder;
  in response to a recognition of a requirement to a change of material from a starting material to a subsequent material, calculating a time point in which a change of material preparation process needs to be started, based on an obtained parameter indicative of a time period required for said change of material preparation process;
  at said calculated time point;
  driving at least one storage flap mechanically assembled to said downpipe, to stop a feeding of the starting material to the storage scale;
  emptying the storage tank from the starting material;
  driving the at least one storage flap to a close state; and
  filling the storage tank with the subsequent material;
  wherein the recognition of the requirement, the emptying of the staring material and the filling of the subsequent material are conducted in parallel to a continuous feeding of the extruder by the storage scale with the starting material and a continuous production of an extrusion product with the starting material.

11. An extrusion plant for the production of an extrusion product with at least one extrusion device, comprising:
  an extruder;
  a storage scale for feeding the extruder;
  at least one storage tank for feeding the storage scale;
  at least one downpipe connecting between said at least one storage tank and said storage scale;
  at least one sensor device for determining a filling level of at least one of the at least one storage tank and the storage scale; and
  a control unit that executes code instructions for:
    in response to a recognition of a requirement to a change of material from a starting material to a subsequent material, calculating a time point in which a change of material preparation process needs to be started, based on an obtained parameter indicative of a time period required for said change of material preparation process;
    at said calculated time point;
    driving at least one storage flap mechanically assembled to said downpipe, to stop a feeding of the starting material to the storage scale;
    emptying the storage tank from the starting material;
    driving the at least one storage flap to a close state; and
    filling the storage tank with the subsequent material;
    wherein the recognition of the requirement, the emptying of the staring material and the filling of the subsequent material are conducted in parallel to a continuous feeding of the extruder by the storage scale with the starting material and a continuous production of an extrusion product with the starting material.

12. The method of claim 10, further comprising a cleaning of the storage tank, conducted after the emptying of the storage tank from the starting material and before the filling of the storage tank with the subsequent material, said cleaning is conducted in parallel to the continuous feeding of the extruder by the storage scale with the starting material and the continuous production of the extrusion product with the starting material.

13. The extrusion plant of claim 11, wherein the control unit further executes code instructions for cleaning of the storage tank, said cleaning is conducted after the emptying of the storage tank from the starting material and before the filling of the storage tank with the subsequent material, said cleaning is conducted in parallel to the continuous feeding of the extruder by the storage scale with the starting material and the continuous production of the extrusion product with the starting material.

* * * * *